United States Patent [19]

Tanaka et al.

[11] Patent Number: 4,802,046

[45] Date of Patent: Jan. 31, 1989

[54] CASING ASSEMBLY FOR A DISC CARTRIDGE

[75] Inventors: Kimio Tanaka; Haruo Shiba, both of Nagano, Japan

[73] Assignee: TDK Corporation, Japan

[21] Appl. No.: 10,897

[22] Filed: Feb. 4, 1987

[30] Foreign Application Priority Data

Feb. 10, 1986 [JP] Japan ............................ 61-16788[U]

[51] Int. Cl.[4] .............................................. G11B 23/03

[52] U.S. Cl. .................................................... 360/133

[58] Field of Search ................. 360/133, 132; 369/291

[56] References Cited

U.S. PATENT DOCUMENTS 3,416,150 12/1968 Lindberg ............................... 360/97

3,529,301 9/1970 Hiruta ................................ 360/133

4,613,044 9/1986 Saito et al. .......................... 360/133

4,692,831 9/1987 Suzuki ................................ 360/133

FOREIGN PATENT DOCUMENTS 0137965 4/1985 European Pat. Off. ............ 360/133

58-141474 8/1983 Japan .................................. 360/133

*Primary Examiner*—Robert S. Tupper

*Attorney, Agent, or Firm*—Steinberg & Raskin

[57] ABSTRACT

A disc cartridge capable of providing a casing with torsional rigidity sufficient to ensure safety of a disc and smooth operation of a shutter. In the disc cartridge, an upper cover plate and a lower cover plate constituting a casing are formed at each of peripheral end walls thereof with projections and recesses engaged with one another, so that the cover plates may be joined together through the projections and recesses to form the casing which exhibits torsional rigidity sufficient to prevent deformation of the casing.

18 Claims, 6 Drawing Sheets

CASING ASSEMBLY FOR A DISC CARTRIDGE

BACKGROUND OF THE INVENTION

This invention relates to a disc cartridge, and more particularly to a disc cartridge which has a hard disc, particularly, a double-sided type hard disc housed in a casing.

In general, a disc-type data recording carrier such as a compact disc (CD), a video disc (LD) or the like is used in a manner to be removed from a packing case and set in a recording and/or reproducing equipment such as a disc player.

Conventionally, it has been desirable that such a disc-type recording carrier is protected from an environment because it is not only readily covered with dust and damaged but adversely affected due to a variation in temperature. For this purpose, the use of an envelope such as a tray, a casing or the like has been proposed to protect the disc.

In general, an envelope in which a hard disc is housed has a sliding member such as a shutter or the like mounted thereon and must be provided therein with a sufficient internal space in which the hard disc is received, so that a wall thickness of the envelope is substantially decreased to a degree sufficient to deteriorate its torsional rigidity. This often results in not only the hard disc being damaged due to the contact with the envelope but the function of the sliding member being deteriorated.

Accordingly, it would be highly desirable to provide a disc cartridge which is capable of safely housing a disc in an envelope or casing without damaging it and ensuring satisfactory function of a sliding member mounted in the casing.

SUMMARY OF THE INVENTION

Briefly speaking, in accordance with the present invention, a disc cartridge is provided. The disc cartridge includes a casing comprising an upper cover plate and a lower cover plate joined together to define therein a space in which a disc is rotatably housed. Also, the disc cartridge includes a shutter arranged to operate at least a window provided at the casing to insert a head of a disc player therethrough into the disc cartridge. The casing is provided therein with a pair of actuators each of which is adapted to releasbly lock the shutter. The disc cartridge also includes a disc receiver which is arranged in the casing and operatively connected to each of the actuators to selectively receive therein a part of a peripheral portion of the disc to hold the disc at a substantially central position in a thickness direction of the disc cartridge. The upper and lower cover plates are alternatively formed at each of peripheral end walls thereof with mutually engaged fitting means and fitted means in a manner to positionally correspond to each other. More particularly, the upper cover plate is formed at a front end wall thereof with one of first fitting means and first fitted means and at a rear end wall thereof with one of second fitting means and second fitted means, and positionally correspondingly the lower cover plate is formed at a front end wall thereof with the other of the first fitting means and fitted means and at a rear end wall thereof with the other of the second fitting means and fitted means, so that the upper and lower cover plates may be securely and releasably joined to each other through an engagement between the first fitting means and the first fitted means and that between the second fitting means and the second fitted means. The fitting means and fitted means provided at the front end surfaces of the cover plates may be positioned so as to be covered with the shutter and those of the rear end surfaces may be arranged so as to be positioned within a range which permits them to be covered with a label to be attached thereto. Further, the upper cover plate is formed at each of side end walls with one of third fitting means and third fitted means and positionally correspondingly the lower cover plate is formed at each of side end surfaces with the other of the third fitting means and fitted means.

In a preferred embodiment of the present invention, the fitting means and fitted means comprise tongue-like projections and cutout-like recesses, respectively.

Also, in a preferred embodiment of the present invention, the fitting and fitted means of the front and rear end walls of the cover plates are arranged in a manner to be exposed to an outer surface of the casing and those of side end walls thereof are provided in a manner to be hidden from the outer surface.

Accordingly, it is an object of the present invention to provide a disc cartridge which is capable of exhibiting sufficient torsional rigidity.

It is another object of the present invention to provide a disc cartridge which is capable of effectively preventing deformation of a casing.

It is another object of the present invention to provide a disc cartridge which is capable of ensuring safety of a disc and smooth operation of the disc cartridge.

It is a further object of the present invention to provide a disc cartridge which is capable of providing a casing with torsional rigidity sufficient to ensure safety of a disc and smooth operation of disc cartridge.

It is still another object of the present invention to provide a disc cartridge which is capable of accomplishing its smooth operating for a long period of time with high reliability.

It is yet another object of the present invention to provide a disc cartridge which is capable of constantly keeping a disc at a safe state in a casing and causing a shutter to satisfactorily function.

It is still a further object of the present invention to provide a disc cartridge which is capable of accomplishing the above-noted objects without deteriorating an aesthetic sense of the disc cartridge.

It is yet a further object of the present invention to provide a disc cartridge which is capable of accomplishing the above-noted objects with a simple structure.

Still other objects and advantages of the invention will in part be apparent from the specification.

The invention accordingly comprises the features of construction, combination of elements, and arrangement of parts which will be exemplified in the construction hereinafter set forth.

BRIEF DESCRIPTION OF THE DRAWINGS

For a fuller understanding of the invention, reference is had to the following description taken in connection with the accompanying drawings in which like reference numerals designate like or corresponding parts throughout; wherein.

DETAILED DESCRIPTION OF THE PREFERRED EMBODIMENTS

A disc cartridge according to the present invention will now be described hereinafter with reference to the accompanying drawings.

Figure 1:
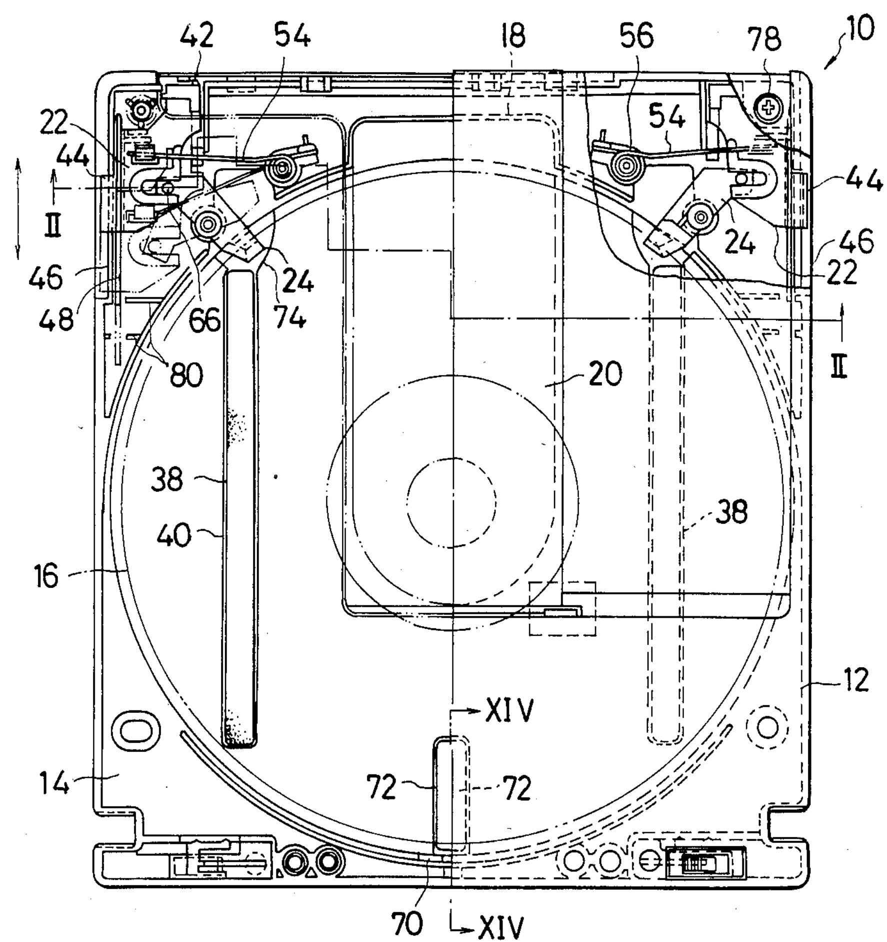
FIG. 1 is s a partly cutaway plan view showing an embodiment of a disc cartridge according to the present invention.

FIG. 1 generally shows an embodiment of a disc cartridge according to the present invention.

Figure 2:
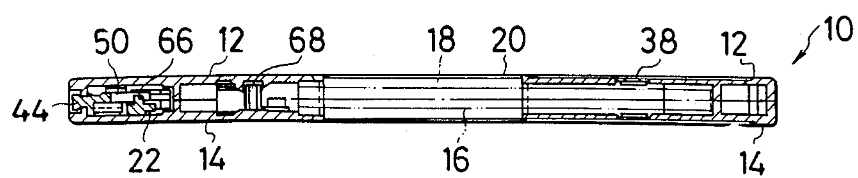
FIG. 2 is a vertical sectional view taken along line II—II of FIG. 1.
Figure 3:
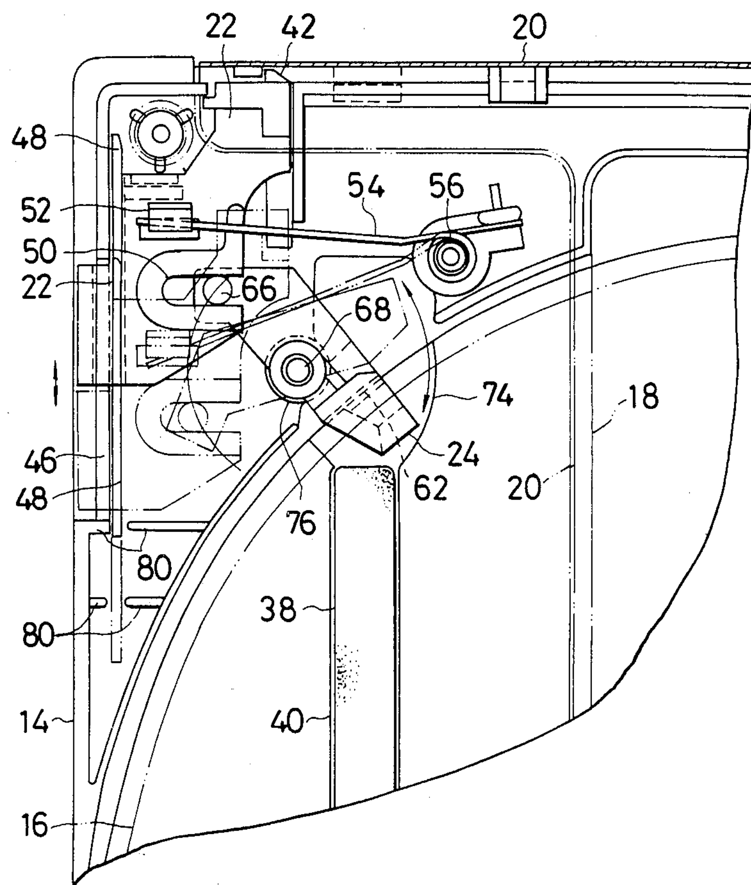
FIG. 3 is a partly enlarged view showing an actuating section of the disc cartridge shown in FIG. 1.

A disc cartridge of the illustrated embodiment, as shown in FIGS. 1 to 3, includes a casing 10 comprising an upper cover plate 12 and a lower cover plate 14 joined together so as to define an inner space therein, and a disc 16 received or housed in the space of the casing 10. The casing 10 is formed with at least a window 18 for inserting a disc driving element of a disc player (not shown) such as a disc head therethrough into the casing 10. The window 18 is operated by a shutter 20. Also, the disc cartridge of the illustrated embodiment includes a pair of actuators 22 arranged in the casing 10 for releasably locking the shutter 20 and a disc receiver 24 provided in the casing 10 and operatively connected to or engaged with each of the actuators 22. The disc receiver 24 is adapted to selectively receive a part of a peripheral portion of the disc 16 or a part of each of upper, lower and peripheral end surfaces of the disc 16 to hold the disc at a substantially central position in a thickness direction of the disc cartridge. The actuator 22 is arranged to be slidable in a longitudinal direction of the cartridge indicated by arrows in FIGS. 1 and 3, and the disc receiver 24 is adapted to be approachably moved with respect to the disc 16 when the actuator 22 is slidably moved. Therefore, when the shutter 20 is actuated to close the window 18, the disc receiver 24 may be engaged with a part of the disc 16 or insert therein a part of the disc to force it toward a rear end of the casing 10 while holding it at the substantially central position of the casing in the thickness direction of the casing as described above, to thereby keep it at a state of floating in the space defined in the casing 10, whereas when the shutter 20 is actuated to open the window 18, the disc receiver 24 may be disengaged from the disc 16 to prepare the disc for engagement with the disc driving element of the disc player which is then inserted through the opened window 18 into the cartridge.

Figure 4:
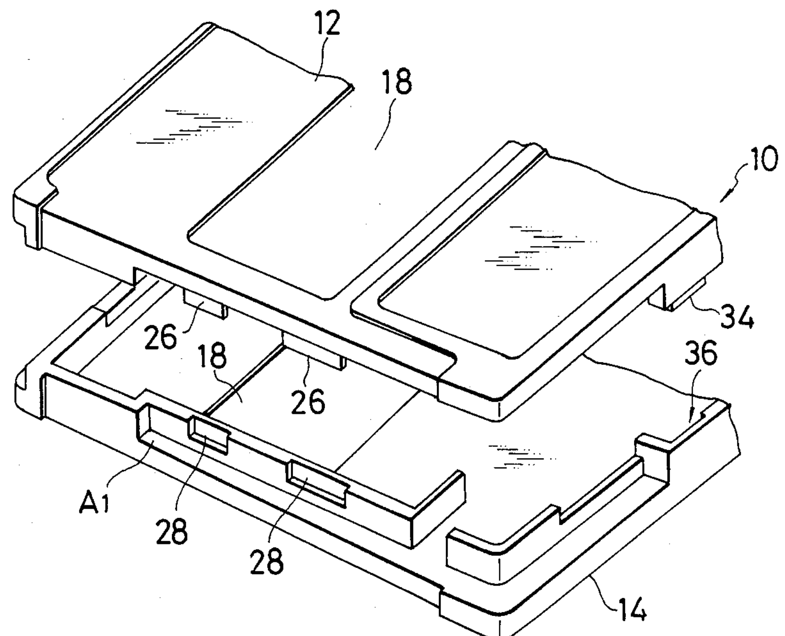
FIG. 4 is a fragmentary exploded perspective view showing a front portion of each of upper and lower cover plates constituting a casing.
Figure 5:
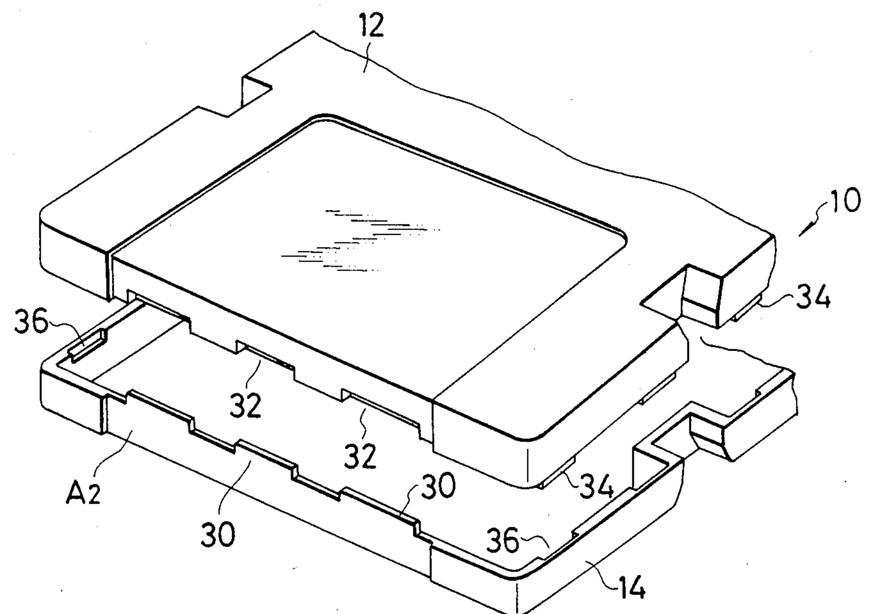
FIG. 5 is a fragmentary exploded perspective view showing a rear portion of each of upper and lower cover plates.

The upper cover plate 12 of the casing 10, as shown in FIGS. 4 and 5, is formed at a front end wall thereof with one of first fitting means 26 and first fitted means 28 which are exposed to an outer surface of the cover plate 12 and at a rear end wall thereof with one of second fitting means 30 and second fitted means 32 which are exposed to the outer surface, and correspondingly the lower cover plate 14 is formed at a front end wall thereof with the other of the first fitting means 26 and fitted means 28 and at a rear end wall thereof with the other of the second fitting means 30 and fitted means 32. In the illustrated embodiment, the upper cover plate 12 is provided with the first fitting means 26 comprising projections and the second fitted means 32 comprising recesses, and the lower cover plate 14 is provided with the first fitted means 28 comprising recesses adapted to be fittedly engaged with the projections 26 and the second fitting means 30 comprising projections adapted to be fittedly engaged with the recesses 32. Also, the upper cover plate 12 is formed at each of side end surfaces thereof with one of third fitting means 34 and third fitted means 36 in a manner to be hidden from the outer surface of the cover plate 12 and correspondingly the lower cover plate 14 is formed at each of side end walls with the other of the third fitting means 34 and fitted means 36. In the illustrated embodiment, the upper cover plate 12 is provided with the third fitting means 34 comprising projections and the lower cover plate 14 is provided with the third fitted means 36 comprising recesses. Thus, in the illustrated embodiment, the fitting and fitted means are provided at the four end walls to be engaged with one another to significantly increase torsional rigidity of the casing 10 even when the upper and lower cover plates each are formed to have a small thickness.

Figure 6:
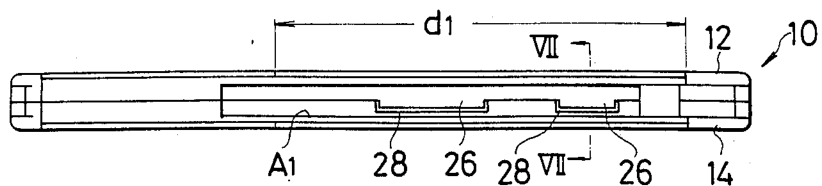
FIG. 6 is a front elevation view of a casing.
Figure 7:
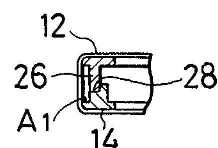
FIG. 7 is a sectional view taken along line VII—VII of FIG. 6.
Figure 8:
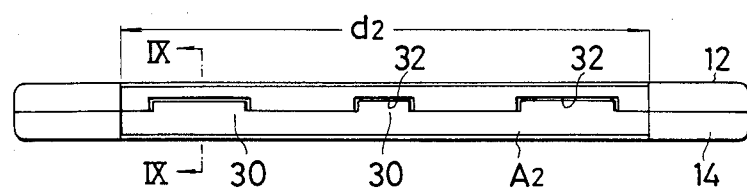
FIG. 8 is a rear elevation view of a casing.
Figure 9:
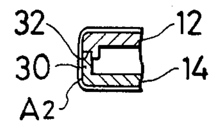
FIG. 9 is a sectional view taken along line IX—IX of FIG. 8.
Figure 11:
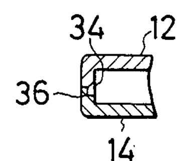
FIG. 11 is a sectional view taken along line XI—XI of FIG. 10.
Figure 10:
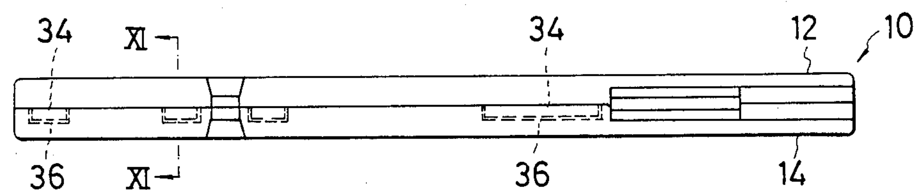
FIG. 10 is a side elevation view of a casing.

Further, in the illustrated embodiment, the first fitting means 26 and fitted means 28 of the front end walls of the upper and lower cover plates 12 and 14 are provided within a range of a width d1 of the shutter and the second fitting and fitted means 30 and 32 of the rear end walls are arranged within a range of a width d2 of a label attached thereto, as shown in FIGS. 6 and 8. Also, the third fitting and fitted means 34 and 36 of the side end walls are hidden from the outer surface of the casing, as shown in FIGS. 10 and 11. Such construction, as shown in FIGS. 6, 8 and 10, prevents a configuration of the casing from being unsightly due to the arrangement of the fitting and fitted means 26 to 36. Fitted engagement between the fitting means and fitted means ensures secure engagement between the upper cover plate 12 and the lower cover plate 14 to provide the casing with satisfactory sealing property sufficient to prevent any foreign material such as dust or the like from entering the casing 10.

It is preferable that the fitting means 26, 30 and 34 each comprise at least one tongue-like projection and the fitted means 28, 32 and 36 each comprises at least one cutout-like recess fittedly engaged with the tongue-like projection, as shown in FIGS. 4 and 5. It is particularly preferable that the fitted means each are a cutout-like recess formed in a manner to leave a part of the end wall in a thickness direction of the end wall and the fitting means each are a tongue-like projection formed to have a thickness equal to or smaller than that of the end wall. When the thickness of the fitting means is larger than a half of that of the end wall, a portion of the thickness of the projection exceeding a half of that of the end wall is preferably inwardly projected from the end wall.

Furthermore, in the disc cartridge of the illustrated embodiment, the upper cover plate 12 and lower cover plate 14 each are provided on an inner surface thereof with at least a first disc holding member 38, which is preferably arranged in a manner to somewhat project from the inner surface of the cover plate. The disc holding member 38 is positioned so as to be abutted against a non-recording section of the disc such as a peripheral section thereof, a central section thereof or the like. In the illustrated embodiment, each of the cover plates 12 and 14 are provided with two such disc holding members 38 so as to positionally correspond to a substantially peripheral section of the disc and in a substantially symmetric manner, so that the disc 16 may be uniformly supported thereon, and each of the disc holding members 38 is arranged in a shallow recess 40 formed on the inner surface of the cover plate. The disc holding member may be formed of at least one material selected from the group consisting of ultra-high-molecular-weight polyethylene resin, ultra-high-molecular-weight polyethylene foam, graphite polytetrafluoroethylene, polyethylene terephthalate (PET) and polybuthylene terephthalate (PBT).

The shutter 20 comprises a plate member of a substantially U-shape which is movably fitted on the casing 10 so as to be slidable along the upper and lower cover plates 12 and 14.

A pair of the actuators 22, as shown in FIG. 1, are formed to be symmetric and arranged adjacent to both sides of a front portion of the casing 10 in a manner to be not only opposite to each other but symmetric along a longitudinal axis of the cartridge and slidable with respect to the casing 10. Also, the actuators 22 each serve as an actuating lever to actuate operation sections of the disc cartridge. More particularly, each of the actuators 22, as shown in FIG. 3, is provided at a front end thereof with a lock means 42, which comprises, in the illustrated embodiment, a hook-like member integrally formed at the front end of the actuator 22 and is securely engaged with the shutter 20. The actuator 22 is also provided on one side or an outer side thereof with actuating means 44 which comprise, in the illustrated embodiment, a projection integrally formed on the outer side of the actuator 22 and outwardly extending through a horizontally extending cutout or slot 46 formed at a side wall of the casing 10. Also, the actuator 22 has cover means 48 integrally provided on the one side thereof so as to extend in a longitudinal direction thereof. The cover means 48 are formed to thoroughly cover the cutout 46 formed at the side wall of the casing 10 in a sealed manner to function as a dust protective cover for preventing dust from entering the casing 10 through the cutout 46. In addition, the actuator 22 is formed on the other side or an inner side thereof with a guide groove 50 of a substantially U-shape which serves as movement transmission means for transmitting sliding movement of the actuator 22 to the disc receiver 24 as described hereinafter. Further, the actuator 22 is provided on an upper surface thereof with a spring bearing 52 as shown in FIG. 3 which is engaged with one end of a spring 54 held at the other end thereof on a spring holder 56 fixed on the casing 10, so that the actuator 22 may be constantly forced toward a front end of the casing.

Figure 12:
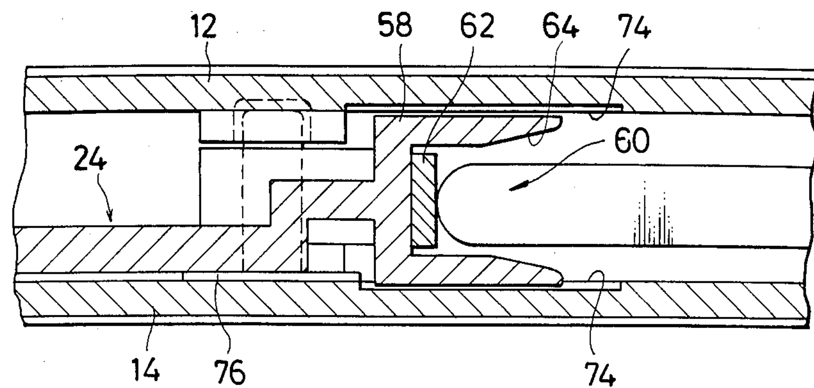
FIG. 12 is a fragmentary sectional view showing a receiver body of a disc receiver.
Figure 13:
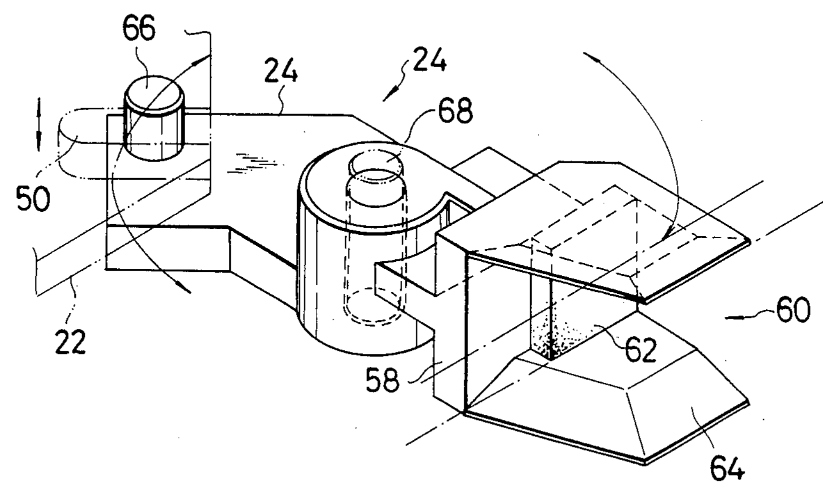
FIG. 13 is a perspective view showing a disc receiver.

A pair of the disc receivers 24, as shown in FIG. 1, are also formed in a manner to be symmetric. Each of the disc receivers 24 is generally formed into a lever-like shape as shown in FIGS. 1 and 3 and provided at one end thereof with a receiver body 58. The receiver body 58, as shown in FIGS. 12 and 13, is formed into a substantially sideways U-shape to define therein a recess designated by reference numeral 60. The recess 60 is provided on an end surface thereof contacted with the peripheral end portion of the disc 16 with an elastic member 62 which serves to prevent unsteadiness and/or damage of the disc in the disc receiver 24. The elastic member 62 may be formed of rubber or a soft plastic material such as polyethylene, polypropylene or vinyl chloride. Such an elastic member may be arranged on upper and lower surfaces of the recess 60 of the receiver body 58. The recess 60 of the receiver body 58 is preferably formed in a manner such that its opened end portion or inlet portion 64 is vertically enlarged so as to facilitate the insertion and removal of a disc 16 with respect to the recess 60.

The so-formed receiver body 58 is positioned adjacent to a peripheral portion of the disc 16 to selectively receive a part of the peripheral portion of the disc 16 in the recess 60 depending upon the sliding movement of the actuator 22 and also act as an elevator for lifting the disc 16. More particularly, the disc receiver 24, as best seen in FIG. 13, is also provided at the other end thereof with a guide pin 66 acting as an operative connection means, which is loosely fitted in the guide groove 50 of the actuator 22 to operatively connect the disc receiver 24 to the actuator 22. The disc receiver 24 is movably fitted at a middle portion thereof on a pivot pin 68 so as to be rotatable about the pin 68 and vertically movable along the pin 68.

In the illustrated embodiment, the guide pin 66 is provided at the disc receiver 24 and the guide groove 50 is formed at the actuator 22. However, the guide pin 66 and guide groove 50 may be provided at the actuator 22 and the disc receiver 24, respectively.

Also, in the illustrated embodiment, the spring 54 may comprise a coiled spring stretchedly arranged in the sliding direction of the actuator 22 or between the disc receiver 24 operatively connected to the actuator 22 and the casing 10. Alternatively, it may comprise a coiled spring wound on the pivot pin 68 of the disc receiver 24. Each of such constructions causes the actuator 22 to be forced toward the front end of the casing 10.

Figure 14:
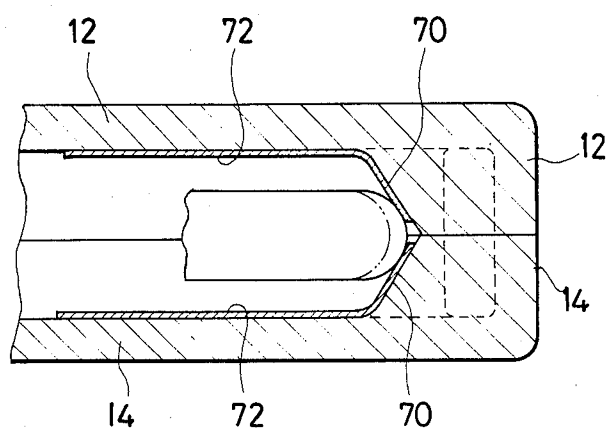
FIG. 14 a sectional view taken along line XIV—XIV of FIG. 1.

Further, in the illustrated embodiment, the casing 10 is formed at a rear end surface 70 of the internal space thereof into a substantially sideways V-shape as shown in FIG. 14, so that the rear end surface may be tapered. Such construction facilitates the positioning of the disc 16 at a center of the casing 10 in the thickness direction of the casing because it is guided along the tapered rear end surface 70. This results in the disc 16 being located at positions indicated at two-dot chain lines and solid lines in FIG. 14 when the disc cartridge is charged in a disc player and removed therefrom, respectively. Also, the casing 10 may have a second disc holding member 72 of a sheet-like shape applied to the tapered rear end surface 70 to ensure safety of the disc in the casing 10 and smooth operation of the disc cartridge. For this purpose, the second disc holding member 72 is preferably formed of a material which is capable of exhibiting lubricating properties, such as ultra-high-molecular-weight polyethylene, ultra-high-molecular-weight polyethylene foam, polyethylene terephthalate (PET), metal sheet such as stainless steel, or the like. Such a material likewise may be applied to portions of the casing 10 adjacent to the tapered rear end surface 70 as shown in FIG. 14.

The casing 10, as shown in FIG. 1, is formed on each of upper and lower surface sections of an inner surface thereof with a pair of recesses 74 so as to positionally correspond to the disc receivers 24, each of which serves to ensure smooth pivotal movement of the disc receiver. The disc receiver 24 is supported on a holder 76. Reference numerals 78 and 80 designate a bolt and a rib, respectively.

Now, the manner of operation of the disc cartridge of the illustrated embodiment constructed in the manner described above will be described hereinafter with reference to FIGS. 1 to 14.

When the disc cartridge is inserted in a disc player (not shown) for the operation, the actuating means or projection 44 of the actuator 22 projecting through the cutout 46 of each of the side walls of the casing 10 are engaged with a projection provided at an insertion port of the disc player to be rearwardly slided along the cutout 46 against the spring 54. The sliding of the projection 44 causes the shutter 20 to be released from the lock means or hook-like member 42, so that the shutter 20 may be moved in a direction of opening the window 18 by means of a shutter actuating mechanism of the disc player. Concurrently, the disc receiver 24 is pivotally moved about the pivot pin 68 due to the sliding of the actuator 22 to release the disc 16 from the recess 70 of the receiver body 58, resulting in the disc 16 being safely supported on the first disc holding members 38 and then operatively engaged with a disc driving element of the disc player.

When, the disc cartridge is to be removed from the disc player, the disc 16 is first disengaged from the disc driving element of the disc player to be put on the disc holding members 38 and then the shutter 20 is moved by means of the shutter actuating mechanism of the disc player to close the window 18. Then, the disc cartridge is removed from the disc player, so that the actuator 22 may be slided toward the front end of the disc cartridge by means of the spring 54 to actuate the disc receiver 24, to thereby fit a part of the disc 16 in the recess 60 of the receiver body 58. This results in the disc 16 being forced toward the rear end of the casing 10 while being held at a state of floating in the the internal space of the casing 10 by the disc receiver 24. Simultaneously, the lock means 42 of the actuator 22 actuate to keep the shutter 20 closed. In this instance, the disc 16 is safely held in the casing 10, because the outer periphery of the disc, as shown in FIGS. 12 and 14, is constantly abutted against the elastic member 62 of the recess 60 of each of the receiver bodies 58 and the disc holding member 72 of the rear end surface 70.

As can be seen from the foregoing, the present invention is so constructed that the upper and lower cover plates of the casing are provided at the peripheral walls thereof with the mutually engaged fitting and fitted means, and more particularly, at the front and rear end walls with the mutually engaged first and second fitting and fitted means in the manner to be exposed to the outer surface of the casing and at the side end walls with the mutually engaged third fitting and fitted means in the manner to be hidden from the outer surface, to thereby rigidly join the cover plates together. Thus, the casing formed by the so-joined cover plates is significantly increased in rigidity and prevents entering of foreign matter such as dust or the like thereinto. Also, the fitting and fitted means of the front end wall are arranged at the positions at which the shutter is arranged and those of the rear end wall are formed at the portion of the casing cover with a label, and the third fitting and fitted means are arranged in the manner to be hidden from the outer surface of the casing. Such construction effectively prevents a configuration of the casing from being unsightly due to the arrangement of the fitting and fitted means.

Such a disc cartridge is required to ensure a large storage capacity of a disc and cause it to operate for a long period of time with high reliability. In order to satisfy such requirements, it is most important that a casing is provided with satisfied rigidity. The present invention can provide the casing with rigidity sufficient to meet such requirements as described above with a simple structure. This results in the disc and sliding section being positively prevented from directly contacting the inner surface of the casing, so that a recording section of the disc and the sliding section may not be adversely affected. Accordingly, the disc cartridge can effectively operate for a long period of time with high reliability. Further, the present invention can exhibit such advantages with a simple structure.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. A disc cartridge, comprising:

a casing comprising an upper cover plate and a lower cover plate joined together to define a space therein;

a disc rotatably housed in said space of said casing;

at least one window provided in said casing to allow insertion of a disc driving element therethrough into said disc cartridge;

a shutter for operatively opening and closing said at least one window;

a pair of actuators arranged in said casing to releasably lock said shutter; and a disc receiver arranged in said casing and operatively connected to at least one of said actuators to selectively hold said disc at a substantially central position of said space in a thickness direction of said space;

said upper cover plate and lower cover plate being alternatively formed at each of peripheral end surfaces thereof with fitting and fitted means engaged with one another in a manner to positionally correspond to each other to provide said casing with sufficient torsional rigidity.

2. A disc cartridge as defined in claim 1, wherein said fitting and fitted means of front end walls of said upper and lower cover plates are provided within a range of a width of said shutter to be positionally covered by said shutter and those of rear end walls thereof are arranged within a range covered by a label.

3. A disc cartridge as defined in claim 1, wherein said fitting and fitted means of each of front and rear end walls of said upper and lower cover plates are formed in a manner to be exposed to an outer surface of said casing and said fitting and fitted means of each of side end walls of thereof are formed in a manner to be hidden from said outer surface.

4. A disc cartridge as defined in claim 1, wherein said fitting means and fitted means comprise projections and recesses, respectively.

5. A disc cartridge as defined in claim 4, wherein said projections each are formed into a tongue-like shape and said recesses each are formed into a cutout-like shape.

6. A disc cartridge as defined in claim 5, wherein said recesses each are formed to leave a part of a thickness of said end wall.

7. A disc cartridge as defined in claim 5, wherein said projections each are formed to have a thickness equal to or smaller than that of said end wall.

8. A disc cartridge as defined in claim 1, wherein said upper and lower cover plates each are provided on an inner surface thereof with at least a disc holding member.

9. A disc cartridge as defined in claim 8, wherein said disc holding member is arranged at a position to abut against only a non-recording section of said disc.

10. The cartridge of claim 1, wherein said upper cover plate is formed at a front end wall thereof with one of first fitting means and first fitted means and at a rear end wall thereof with one of second fitting means and second fitted means, and said lower cover plate is formed at a front end wall thereof with the other of said first fitting and fitted means, and at a rear end wall thereof with the other of said second fitting and fitted means, with said upper and lower cover plates securely and releasably joined together through engagement of said first fitting and fitted means and said second fitting and fitted means.

11. The cartridge of claim 10, additionally comprising said upper cover plate being formed at each of side end walls with one of third fitting and third fitted means, said lower cover plate being formed at each of side end walls with the other of said third fitting and third fitted means, and said fitting means of respective opposite side walls of said upper and lower cover plates positionally corresponding to one another.

12. The cartridge of claim 10, wherein said front wall of said upper cover plate is formed with said first fitting means, said rear wall of said upper cover plate is formed with said second fitted means, said front wall of said lower cover plate is formed with said first fitted means, and said rear wall of said lower cover plate is formed with said second fitting means.

13. The cartridge of claim 11, wherein said side walls of said upper cover plate are each provided with said third fitting means and said side walls of said lower cover plate are each provided with said third fitted means.

14. The cartridge of claim 12, wherein said first and second fitting means each comprise projections and said first and second fitted means each comprise recesses, said projections and recesses being formed to be fittingly engaged with one another.

15. The cartridge of claim 13, wherein said third fitting means comprise projections and said third fitted means comprise recesses, said projections and recesses being formed to fittingly engage one another.

16. The cartridge of claim 14, wherein said respective fitting and fitted means comprise a series of said projections or recesses.

17. The cartridge of claim 15, wherein said respective fitting and fitted means comprise a series of said projections or recesses.

18. The cartridge of claim 1, additionally comprising, a pair of disc receivers, each arranged in said casing and operatively connected to a respective one of said actuators to selectively retain the disc at the substantially central position of said space in the thickness direction of said space.

* * * * *